(12) United States Patent
Gerullis et al.

(10) Patent No.: US 8,287,307 B2
(45) Date of Patent: Oct. 16, 2012

(54) FASTENING DEVICE FOR DETACHABLE HOLDING OF AN ELECTRICAL DISTRIBUTOR BY LATCHING

(75) Inventors: Jens Gerullis, Lemgo (DE); Jens Andresen, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/430,900

(22) Filed: Mar. 27, 2012

(65) Prior Publication Data

US 2012/0184133 A1    Jul. 19, 2012

Related U.S. Application Data

(62) Division of application No. 12/423,896, filed on Apr. 15, 2009, now Pat. No. 8,167,645.

(30) Foreign Application Priority Data

Apr. 18, 2008 (DE) .......................... 10 2008 019 763

(51) Int. Cl.
*H01R 13/66* (2006.01)
(52) U.S. Cl. ......... 439/575; 439/571; 439/404; 248/214
(58) Field of Classification Search .................. 439/575, 439/574, 420, 404, 441; 248/214
See application file for complete search history.

(56) References Cited

U.S. PATENT DOCUMENTS

| | | | |
|---|---|---|---|
| 4,395,586 A | 7/1983 | Eiermann et al. | |
| 4,463,998 A | 8/1984 | Reavis et al. | |
| 4,470,656 A * | 9/1984 | Moser et al. | 439/535 |
| 5,340,340 A | 8/1994 | Hastings et al. | |
| 6,162,092 A | 12/2000 | Lin | |
| 7,052,308 B2 * | 5/2006 | Drane et al. | 439/417 |
| 7,407,406 B2 * | 8/2008 | Arlitt et al. | 439/404 |

FOREIGN PATENT DOCUMENTS

| | | |
|---|---|---|
| DE | 42 23 928 A1 | 4/1993 |
| DE | 43 15 352 A1 | 11/1994 |
| DE | 198 36 622 A1 | 3/2000 |
| DE | 101 39 202 A1 | 3/2003 |
| EP | 1 320 161 A1 | 6/2003 |

* cited by examiner

*Primary Examiner* — Hien Vu
(74) *Attorney, Agent, or Firm* — Roberts Mlotkowski Safran & Cole, P.C.; David S. Safran

(57) ABSTRACT

A fastening unit has a fastening device (1) and an electrical distributor (2) which is lockable to the fastening device by latching. The fastening device has a base plate (3) and with two latch mechanisms (4) which project vertically away from the base plate (3). Several openings (5, 5') for holding screws (6) are formed in the base plate (3), with which the base plate (3) can be fastened to the wall or other support (7), and free ends of the latch mechanisms (4) each having an elastic catch arm (8) with a catch hook (9) and a rigid contact arm (10) opposite the catch arm (8). The fastening device enables the electrical distributor to be fastened quickly, easily, and reliably to a wall or other support, with the possibility of also quick and easy detaching of the distributor, as necessary, from the wall without removing the fastening device.

5 Claims, 5 Drawing Sheets

FASTENING DEVICE FOR DETACHABLE HOLDING OF AN ELECTRICAL DISTRIBUTOR BY LATCHING

CROSS REFERENCE TO RELATED APPLICATION

This application is a divisional of co-pending U.S. patent application Ser. No. 12/423,896.

BACKGROUND OF THE INVENTION

1. Field of Invention

The invention relates to a fastening device for detachable holding of an electrical distributor by latching. In addition, the invention relates to a unit having a fastening device and an electrical distributor which can be connected to the fastening device, the distributor having a housing, four terminal means and a plurality of connecting elements, the individual terminal means each having a cylindrical threaded shoulder with an outside thread on the terminal side and in the terminal means there being several insulation piercing connecting devices and the insulation piercing connecting devices of individual terminal means each being electrically connected to one another by means of a connecting element which is assigned to them.

2. Description of Related Art

Electrical distributors are known from practice and are used to distribute electrical currents, therefore for connecting at least two outgoing multi-core cables to an incoming multi-core cable. The multi-core cables are provided with connecting means which correspond to the terminal means of the electrical distributor, especially can be screwed onto the terminal means of the electrical distributor, the individual leads of the multi-core cable each entering into electrically conductive contact with a terminal element provided in the terminal means.

German Patent Application DE 101 39 202 B4 discloses the initially described electrical distributor which has a housing with several terminal means, the individual terminal means each having on the terminal side a cylindrical threaded shoulder with an outside thread and in the terminal means there being several terminal elements made as insulation piercing connecting devices. To connect a multi-core electrical cable to the terminal means of the electrical distributor, the cable is screwed onto the outside thread of the threaded shoulder by means of a cable terminal component which has a union nut. The cable terminal component is made such that when the union nut is screwed onto the threaded shoulder the insulation piercing connecting devices in the terminal means sever the core insulation of the core ends and make contact with the leads of the cable. In this way, simple connection of the individual leads of the cable to the terminal elements is possible since the connection of individual leads to the terminal elements takes place simply by pressing in the insulation piercing connecting devices. Prior stripping of the individual cores of the cable is therefore unnecessary.

To fasten the known electrical distributor to the wall or other support, a clip with an opening is molded onto the two end faces of the rectangular housing and is used to hold a screw so that the housing can be screwed to the wall. However, the disadvantage here is that, for repeated detachment of the distributor, for example, for repair purposes, the screws must be unscrewed; this is relatively time-consuming.

SUMMARY OF THE INVENTION

Therefore, a primary object of the present invention is to provide a fastening device using which the electrical distributor can be fastened quickly and easily, but still reliably to a wall or other support, with the possibility of also again detaching the distributor, as necessary, from the wall or the fastening device quickly and easily.

Moreover, another object of the invention is to devise a corresponding unit comprised of a fastening device and an electrical distributor which can be connected to the fastening device.

These objects are achieved by a device of the initially described type which has a base plate and two latch means which project vertically away from the base plate, in the base plate several openings for holding fasteners, especially screws, being made, with which the base plate can be fastened to the wall or other support. The free ends of the latch means each have an elastic catch arm with a catch hook and a rigid contact arm opposite the catch arm.

The fastening device in accordance with the invention thus makes it possible to fasten an electrical distributor to a support, for example a wall, by the fastening device with its base plate being screwed onto the wall and the electrical distributor then being locked onto the latch means of the fastening device, the latch means being made such that the electrical distributor can be removed again from the fastening device by simply releasing the latching. This is achieved by each latch means having a catch arm with a catch hook and a rigid contact arm which is opposite the catch arm. The latch means are made such that, when the electrical distributor has been completely slipped onto the fastening device, the free ends of the latch means extend through the openings to the extent that the catch hooks of the catch arms project out of the openings on the side of the housing opposite the fastening device and each overlap the edge region of the openings in the housing of the distributor. In this way, the electrical distributor is reliably held in the lengthwise direction of the latch means on the fastening device.

According to an advantageous embodiment of the fastening device in accordance with the invention, the elastic catch arms and the catch hooks of the two latch means are located on the sides of the two latch means facing away from one another. This results in that the two elastic catch arms which, when the electrical distributor is slipped onto the latch means, are deflected against their spring force in the direction toward the rigid contact arms, as a result of their spring force in directions opposite one another press against the inside walls of the openings in the housing of the electrical distributor, by which the electrical distributor is also held without play perpendicular to the lengthwise extension of the latch means.

In order to enable use of the fastening device in a manner as versatile as possible, in the base plate at least two different types of openings are made which differ in their dimensions. In this way, it is possible for the user to use different screws with different diameters and optionally screw heads of different sizes to attach the base plate to the wall. Preferably, the openings of the first type are located on a line with the latch means on the lengthwise axis of the base plate and the openings of the second type are located in pairs opposite one another on the two sides of the two latch means. This arrangement of the openings in the base plate can keep the dimensions of the base plate relatively small so that only a small space is required for attachment of the base plate to a wall.

The fastening device can be advantageously produced especially easily, and thus, economically, by the base plate and the latch means being connected integrally to one another, the fastening device being produced, preferably as a one-piece plastic molded part.

The aforementioned objects are achieved in the initially described unit of a fastening device and an electrical distributor by the housing of the electrical distributor having two parallel arms and a crosspiece which connects the arms to one another so that the housing is made H-shaped, and by two lengthwise openings being made in the region of the crosspiece, through which openings the free ends of the latch means of the fastening device extend so far that the catch hooks of the catch arms on the side of the housing opposite the fastening device project out of the openings and each overlap one edge region of the openings. The threaded shoulders are made on the free ends of the arms.

The H-shape of the housing of the electrical distributor and the arrangement of the elongated openings between the parallel arms of the housing provide a compact unit with an electrical distributor with four terminal means, the base surface of the unit not being larger than the base surface of the electrical distributor. Thus, formation of fastening clips on the end sides or lengthwise sides of the housing of the electrical distributor can likewise be omitted, as can a fastening device which overlaps the housing of the electrical distributor from the outside.

According to one advantageous configuration of the unit in accordance with the invention, in the side of the housing facing the fastening device, adjacent to the openings, there are depressions which overlap the screw heads which have been inserted into the openings in the base plate of the fastening device. In this way, on the one hand, the distance of the electrical distributor from the wall to which the base plate of the fastening device is screwed is reduced, and on the other hand, the result is that the electrical distributor rests with a defined support region on the base plate of the fastening device so that a support surface as large as possible can be ensured.

According to another preferred configuration of the unit, the connecting elements of the electrical distributor are each formed by a conductor bar and the insulation piercing connecting devices which are assigned to the conductor bar are made in one piece with the conductor bar. This one-piece execution of the insulation piercing connecting devices with the conductor bar allows them to be produced as a punched and bent part and also to be arranged in the electrical distributor especially easily.

In particular, there are now several possibilities for embodying and developing the fastening device in accordance with the invention and the unit in accordance with the invention as will become more evident from to the following detailed description in conjunction with the accompanying drawings.

DETAILED DESCRIPTION OF THE INVENTION

Figure 2:
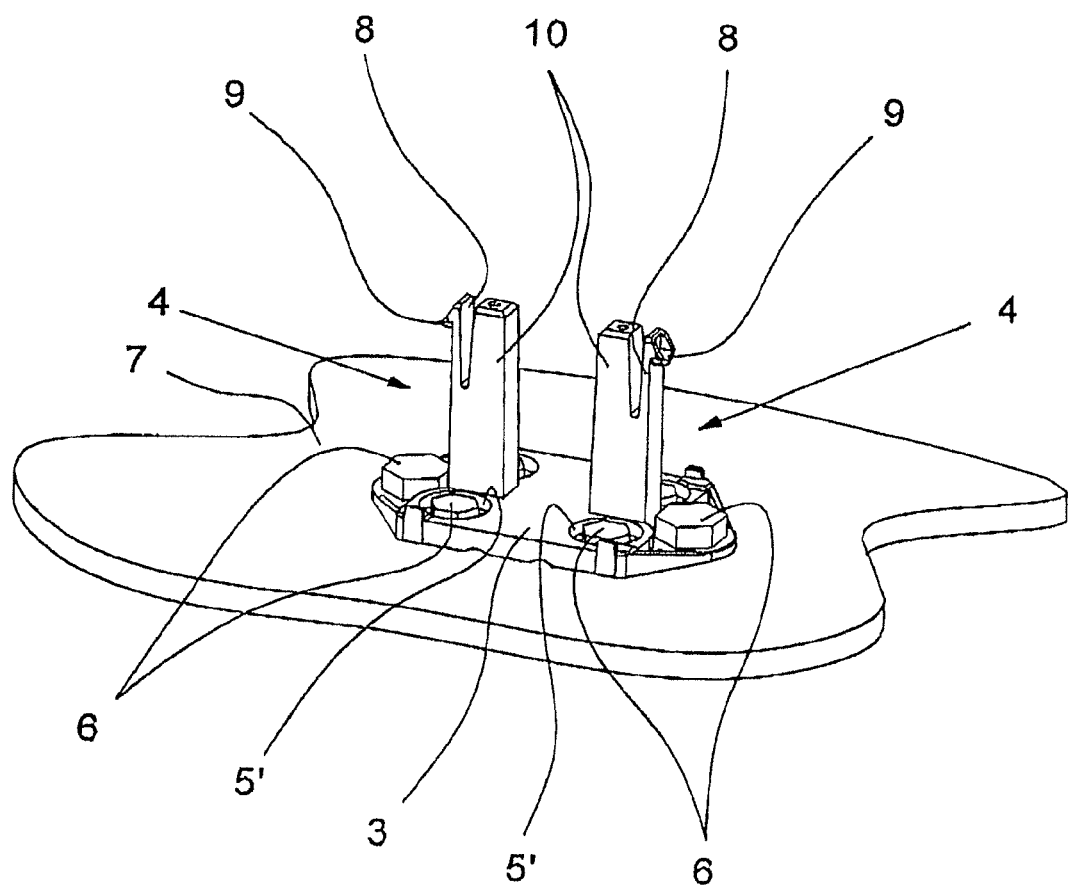
FIG. 2 is a perspective view of the fastening device as shown in FIG. 1, screwed onto a support.
Figure 3:
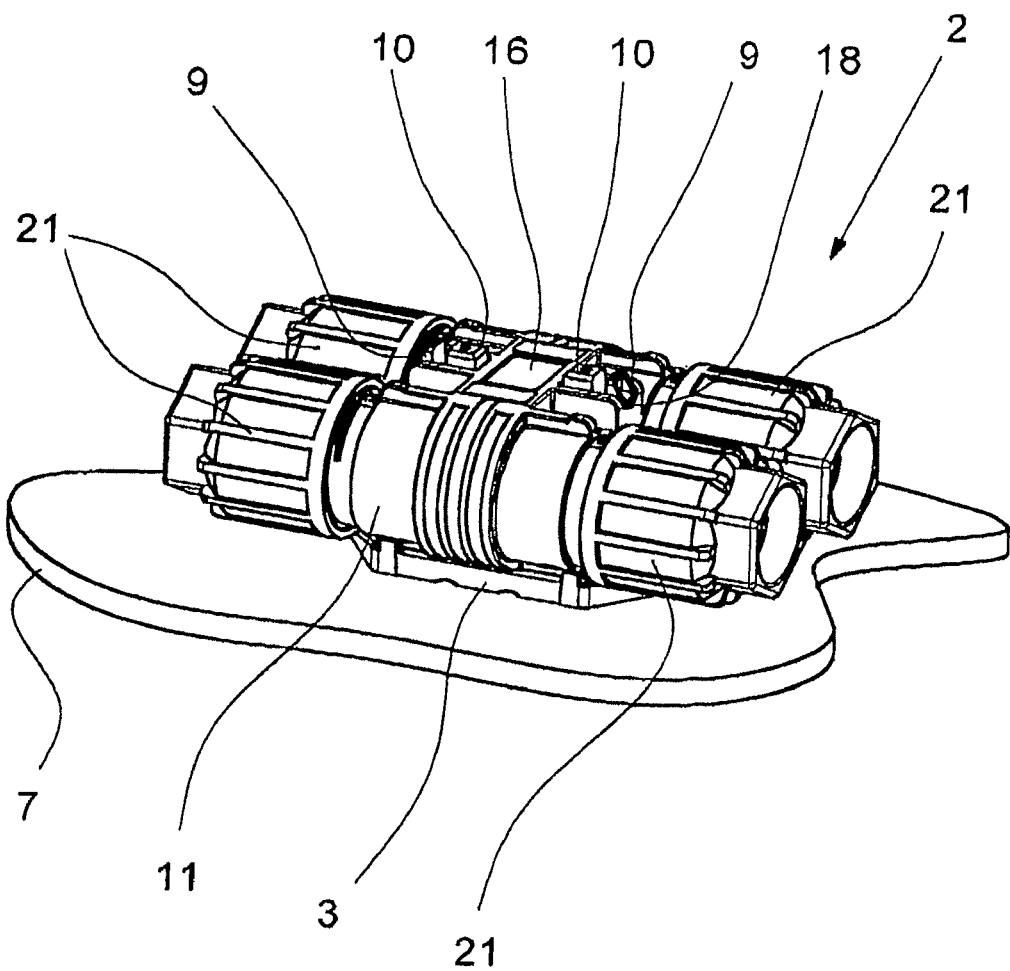
FIG. 3 is a perspective view of an electrical distributor which is attached to the wall by means of a fastening device.
Figure 4:
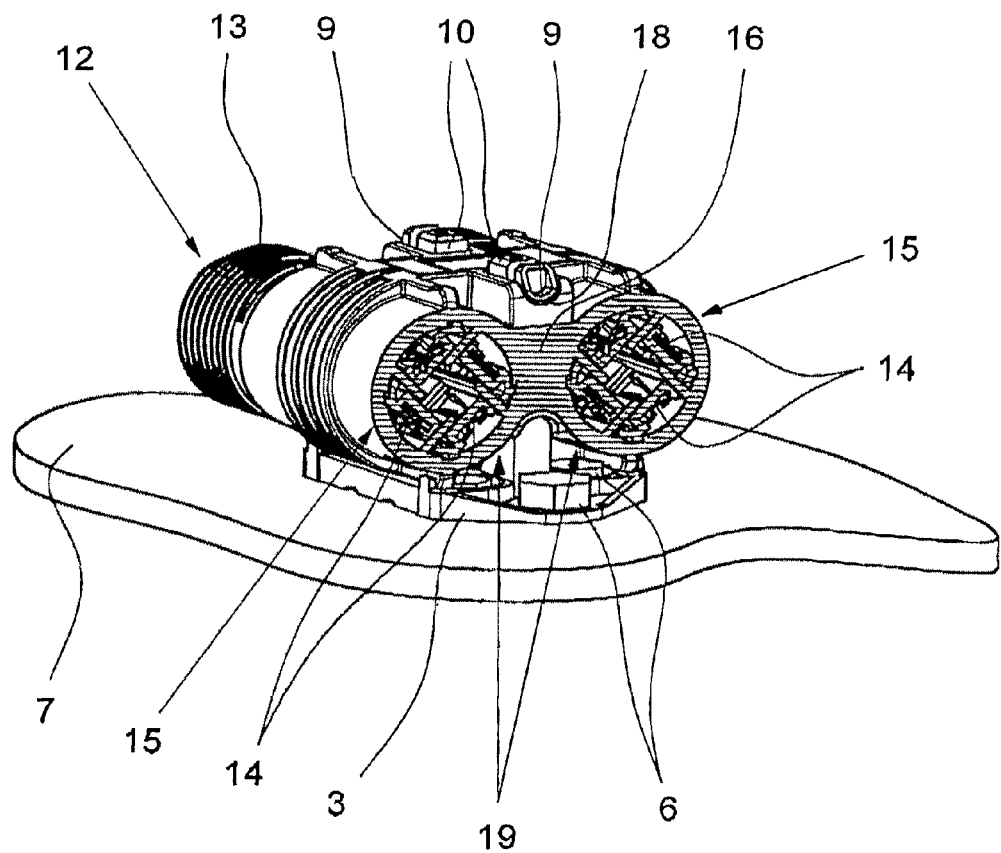
FIG. 4 is a perspective view of the unit as shown in FIG. 3, with the housing of the electrical distributor partially cutaway.
Figure 5:
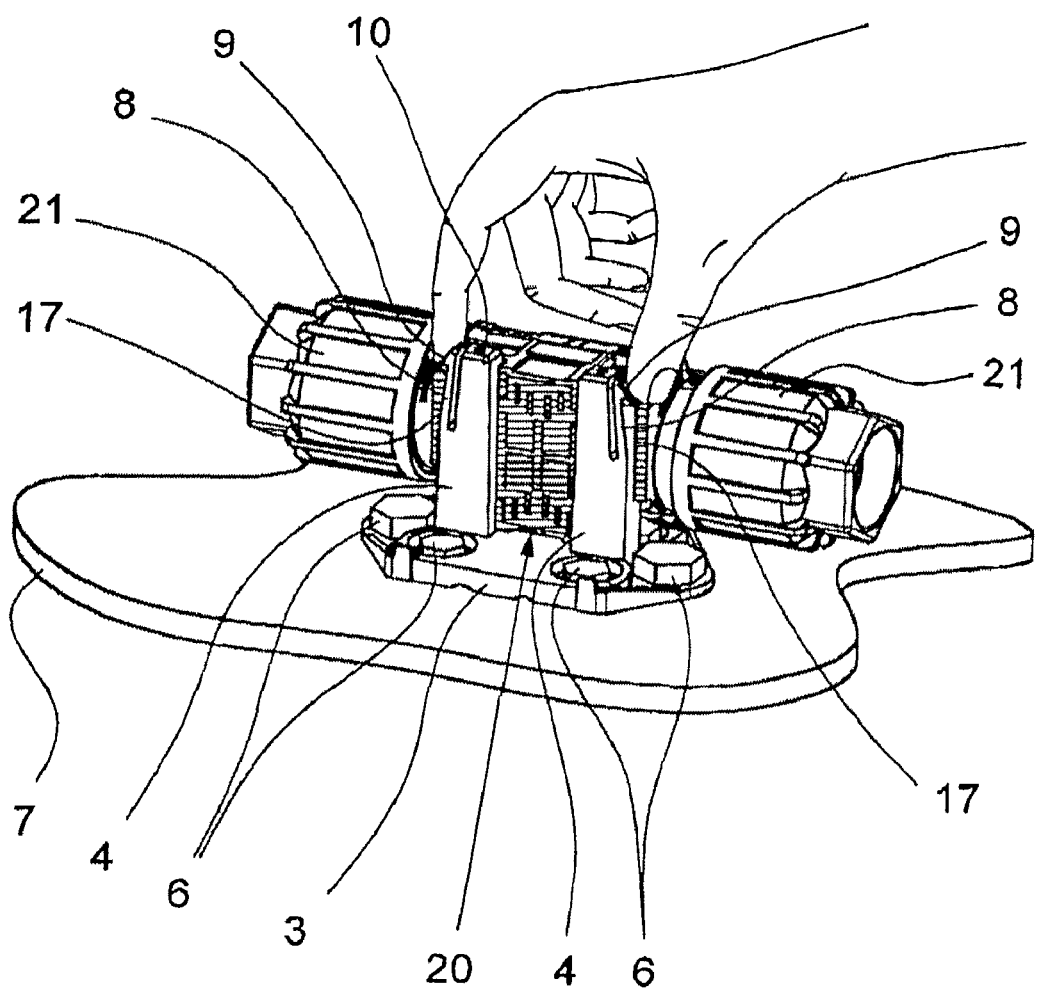
FIG. 5 is a perspective view showing actuation of the fastening device of FIG. 1 for detaching the electrical distributor from the fastening device.

The figures show a fastening device 1 for detachable holding of an electrical distributor 2 by latching (FIGS. 1 & 2) and a unit comprised of a fastening device 1 and an electrical distributor 2 (FIGS. 3 to 5).

The fastening device 1 has a base plate 3 and two latch means 4 which project vertically away from the base plate 3, the latch means 4 being connected integrally to the base plate 3 and the fastening device 1 being made of plastic. In the base plate 3, in the illustrated embodiment, there are a total of six openings 5, 5' for holding screws 6, with which the base plate 3 can be screwed onto a support 7, only a portion of which is shown in FIGS. 2-5. Here, two openings 5 are located on a line with the latch means 4 on the lengthwise axis L of the base plate 3 and four openings 5' are located in pairs on opposite sides of the two latch means 4. As is apparent from FIG. 1, the two openings 5 have a different diameter than the four openings 5' so that the openings 5, 5' can be used for holding screws 6 with different screw heads (see. FIG. 2).

Each of the free ends of the latch means 4 which extend away from the base plate 3 have an elastic catch arm 8 with a catch hook 9 and a rigid contact arm 10 which is opposite the catch arm 8. The elastic catch arms 8 and the catch hooks 9 of the two latch means 4 are located on the sides of the latch means 4 that face away from one another so that the two catch hooks 9 face in opposite directions. The elastic catch arms 8 are made much narrower than the contact arms 10 and can be resiliently deflected in the direction toward the contact arms 10, as is apparent from FIG. 5.

Figure 1:
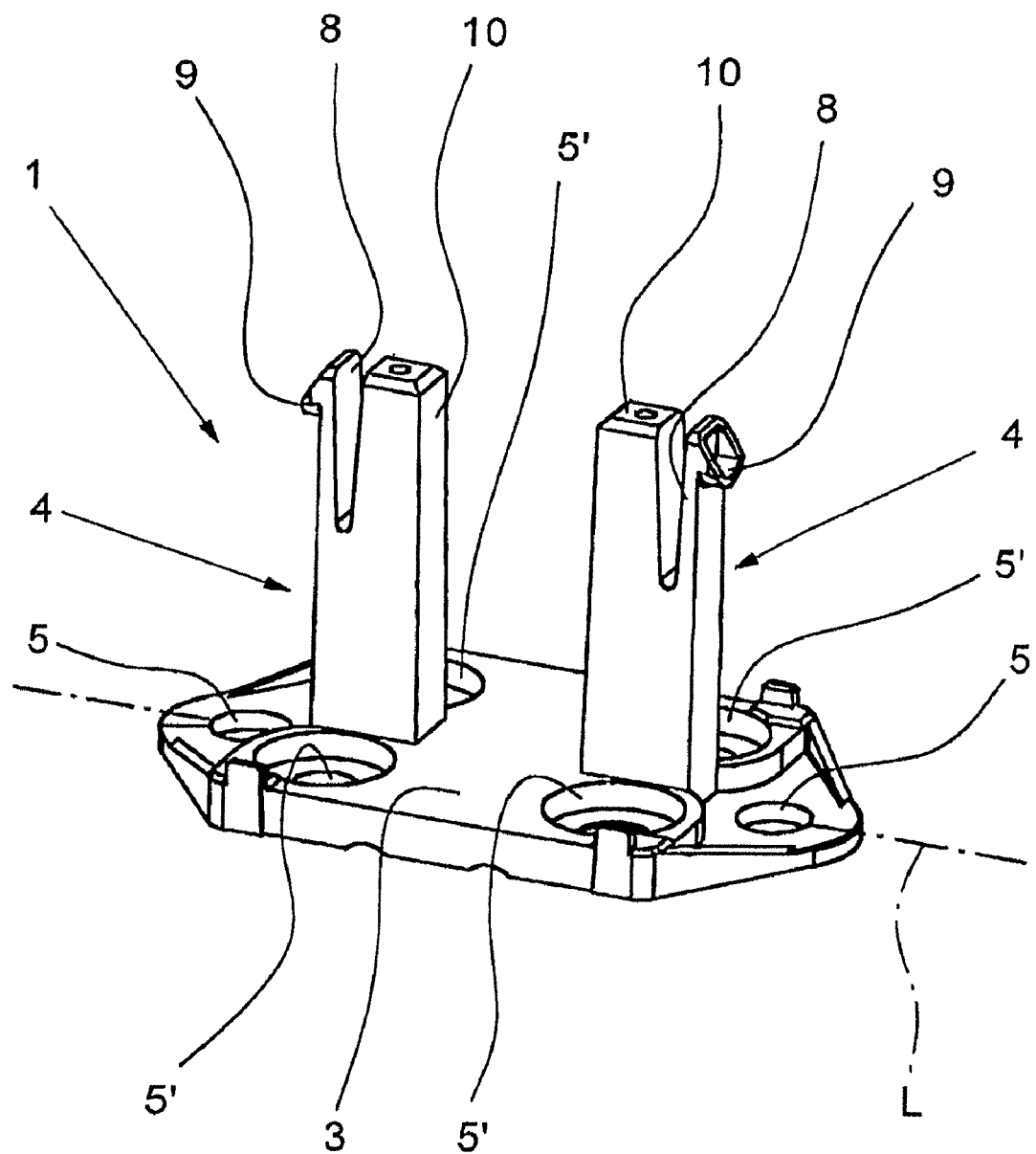
FIG. 1 is a perspective view of a fastening device in accordance with the invention.

Moreover, it is apparent from FIGS. 1 & 2 that the base plate 3 has essentially the shape of a hexagon, the individual openings 5, 5' being located in the vicinity of the individual corners. This arrangement of the openings 5, 5' ensures reliable attachment of the base plate 3 on a support 7, regardless of whether two screws 6 are screwed only in the two openings 5 or four screws 6 are screwed in the four openings 5'. Of course, as shown in FIG. 2, screws 6 can be inserted into all openings 5, 5'.

The electrical distributor 2, which is shown in FIG. 3 in the mounted position, has a housing 11 with four terminal means 12, the individual terminal means 12 each having a cylindrical threaded shoulder 13 with an outside thread on the terminal side as can be seen in FIG. 4. In each of the terminal means 12, there are four insulation piercing connecting devices 14 which are used to connect the individual cores of a four-core electrical cable. The housing 11 of the electrical distributor 2 has two parallel arms 15 and a crosspiece 16 which connects the two arms 15 to one another so that the housing 11 is made altogether H-shaped. The threaded shoulders 13 are located on the free ends of the arms 15.

To lock the electrical distributor 2 onto the latch means 4 of the fastening device 1, in the region of the crosspiece 16, two elongated openings 17 are made in the housing 11 so that the electrical distributor 2 can be slipped onto the latch means 4. The latch means 4 and the openings 17 are made such that the catch hooks 9 of the catch arms 8 in the completely locked position of the electrical distributor 2 project out of openings 17 on the side of the housing 11 opposite the fastening device 1 and each overlap an edge region 18 of the openings 17. In this way, reliable fastening of the electrical distributor 2 in the lengthwise direction of the latch means 4 is ensured. The elastic properties of the catch arms 8 which in the locked position each press against the wall of the openings 17, moreover, ensure reliable fastening of the distributor 2 perpendicular to the extension of the latch means 4, i.e., in the lengthwise direction of the distributor 2.

If the electrical distributor 2 is to be detached from the fastening device 1, as shown in FIG. 5, the catch arms 8 are simply pressed with two fingers in the direction of the contact arms 10 so that the catch hooks 9 no longer overlap the edge regions 18 of the openings 17. Thus, the electrical distributor 2 can be easily removed from the latch means 4 in an upward direction, while the fastening device 1 remains screwed onto the support 7.

As is apparent from FIG. 4, in the side of the housing 11 facing the fastening device 1 and the base plate 3 adjacent to the openings 17, there are depressions 19 each of which overlaps the screw heads which have been inserted in the openings 5, 5' in the base plate 3. In this way, it is ensured that the housing 11 of the electrical distributor 2 rests with a support surface 20 made, first of all, between the openings 17 on the base plate 3 of the fastening device 1 so that support with an area as large as possible is ensured (FIG. 5). Making the depressions 19 in the housing 11 of the electrical distributor 2 thus results in that, at least when using "normal" screws with "normally" tall screw heads, the housing 11 of the electrical distributor 2 does not rest on the screw heads. This prevents a situation in which the electrical distributor 2 is not located parallel to the base plate 3 of the fastening device 1 when the screws 6 have not be been quite uniformly screwed in; this could lead to tilting of the electrical distributor 2 on the fastening device 1.

To connect a multi-core electrical cable to the electrical distributor 2 and to the terminal means 12, a cable terminal component which is connected to the cable is screwed with a union nut 21 onto a threaded shoulder 13, the cable terminal component being made such that when the union nut 21 is screwed onto the threaded shoulder 13 the insulation piercing connecting devices 14 in the terminal means 12 sever the core insulation of the core ends and make contact with the leads of the cable. A cable terminal component with which the connection of a multi-core cable to a terminal means 12 of the electrical distributor 2 can take place especially easily is described in German Patent Application DE 198 36 622 A1. The known cable connection component in addition to the union nut 21, which is shown only in FIGS. 3 & 5, has a core holding and guiding part in which a number of core guide channels which corresponds to the number of cores of the cable to be connected is made.

What is claimed is:

1. Fastening unit assembly, comprising a fastening device and an electrical distributor which is lockable to the fastening device, wherein the fastening device comprises:

a base plate, and two latch means which project upwardly and perpendicularly away from the base plate, the base plate being provided with a plurality of openings for receiving fasteners with which the base plate is fastenable to a wall or support, and free ends of the latch means each having an elastic catch arm, each of the catch arms having a catch hook and each rigid contact arm that is located opposite each of the catch arms; wherein the free end of each latch means is bifurcated so as to form the elastic catch arm, and said rigid contact arm, wherein the catch hooks of the two latch means face outward in opposite directions;

wherein the distributor comprises:

a housing, four electrical terminal means and a plurality of connecting elements, each terminal means having a cylindrical threaded shoulder on a terminal side with an outside thread and several insulation piercing connecting devices being provided in each terminal means, the insulation piercing connecting devices each being electrically connected to one another by a respective connecting element, the housing having two elongated parallel arms, each end of each of the arms having one of the respective electrical terminal means and a crosspiece which connects the arms to one another so that the housing is H-shaped, the threaded shoulders being located on free ends of the arms, and, two lengthwise openings being provided on opposite ends of the crosspiece, free ends of the latch means of the fastening device extending through the openings so that the catch hooks of the catch arms project out of the openings and overlap an edge region of a respective one of the openings.

2. Fastening unit assembly in accordance with claim 1, wherein, in a side of the housing facing the fastening device, depressions are provided adjacent to the openings which overlap heads of screws inserted in the openings in the base plate of the fastening device.

3. Fastening unit assembly in accordance with claim 1, wherein the connecting elements are each formed by a conductor bar and wherein the insulation piercing connecting devices are made in one piece with the respective conductor bar.

4. Fastening unit assembly in accordance with claim 1, wherein each cable terminal component has a respective union nut that is screwable onto the outside thread of the threaded shoulders, the cable terminal component being made such that, when the union nut is screwed onto the threaded shoulder, the insulation piercing connecting devices in the terminal means sever core insulation of core ends of a multi-core cable which is to be connected so as to make contact with the leads of the cable.

5. Fastening unit in accordance with claim 1, wherein the catch hook of each of the catch arms faces away from the rigid contact arm of the respective catch arms.

\* \* \* \* \*